United States Patent
Holma et al.

(10) Patent No.: US 6,463,294 B1
(45) Date of Patent: Oct. 8, 2002

(54) REDUCING INTERFERENCE IN A MOBILE COMMUNICATIONS SYSTEM

(75) Inventors: Harri Holma, Espoo (FI); Antti Toskala, Helsinki (FI); Riku Pirhonen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/401,130

(22) Filed: Sep. 22, 1999

Related U.S. Application Data

(63) Continuation of application No. PCT/FI98/00302, filed on Apr. 7, 1998.

(30) Foreign Application Priority Data

Apr. 9, 1997 (FI) .................................................. 971477

(51) Int. Cl.⁷ ................................................. H04Q 7/20
(52) U.S. Cl. ........................ 455/513; 455/63; 455/67.3
(58) Field of Search .................................. 455/450, 509, 455/513, 422, 432, 436, 62, 63, 67.1, 67.3; 370/320, 355

(56) References Cited

U.S. PATENT DOCUMENTS

| | | | |
|---|---|---|---|
| 5,047,762 A | * | 9/1991 | Bruckert ..................... 455/513 |
| 5,862,487 A | * | 1/1999 | Fujii et al. .................. 455/513 |
| 5,884,145 A | * | 3/1999 | Haartsen ..................... 455/450 |
| 5,933,423 A | * | 8/1999 | Laakso et al. ............... 455/561 |
| 5,960,350 A | * | 9/1999 | Schorman et al. .......... 455/513 |
| 6,018,663 A | * | 1/2000 | Karlsson et al. ............ 455/513 |
| 6,072,988 A | * | 6/2000 | Minegishi ................... 455/513 |

FOREIGN PATENT DOCUMENTS

| | | |
|---|---|---|
| EP | 0491668 | 6/1992 |
| EP | 0493904 | 7/1992 |
| EP | 0651531 | 5/1995 |
| EP | 0659028 | 6/1995 |
| WO | WO 9524086 | 9/1995 |
| WO | WO 9601544 | 1/1996 |
| WO | WO 9611534 | 4/1996 |
| WO | 98/17077 | 4/1998 |

* cited by examiner

*Primary Examiner*—Nay Maung
(74) *Attorney, Agent, or Firm*—Altera Law Group, LLC

(57) ABSTRACT

In mobile communications systems of the CDMA type in particular detection of individual signals from the received common signal with known methods requires much processing capacity of the mobile communications system. The present invention concerns a method of reducing radio inter-ference in a mobile communications system including at least one base station (BS) and several mobile stations (MS). The mobile communications system uses several traffic channels for communications between the base station (BS) and the mobile stations (MS). The method according to the invention is characterized in that signals received at the same reception point are classified therein into at least two classes according to the interference tolerance of the signal or according to the interference caused by the signal to other signals and/or according to the complexity of decoding of the signal, a special way of functioning is defined for each class, whereby the total interference caused by received signals to one another is reduced by complying with these ways of functioning, and the individual signals of each class are processed at the point of reception in the way of functioning defined for the class in question.

50 Claims, 5 Drawing Sheets

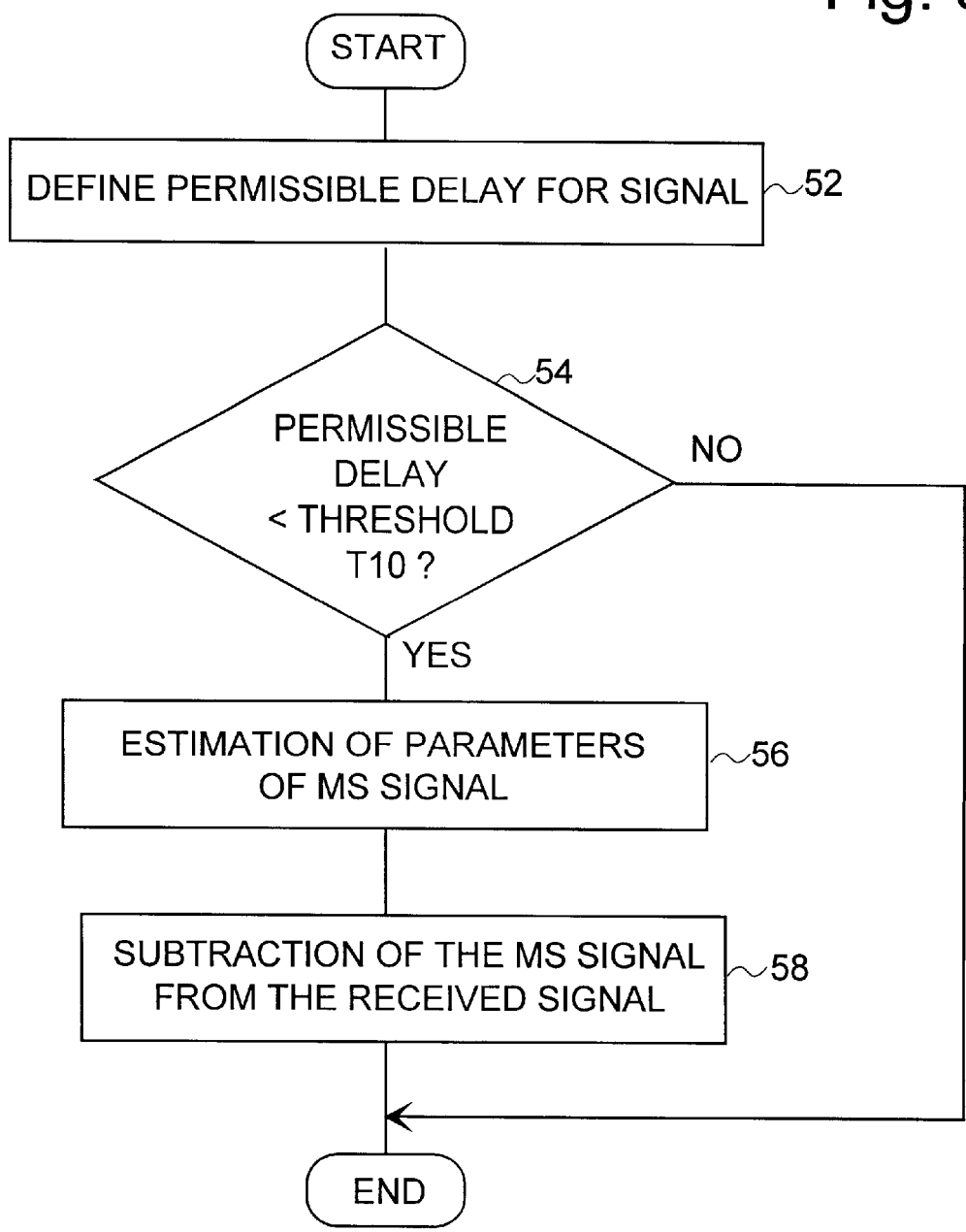

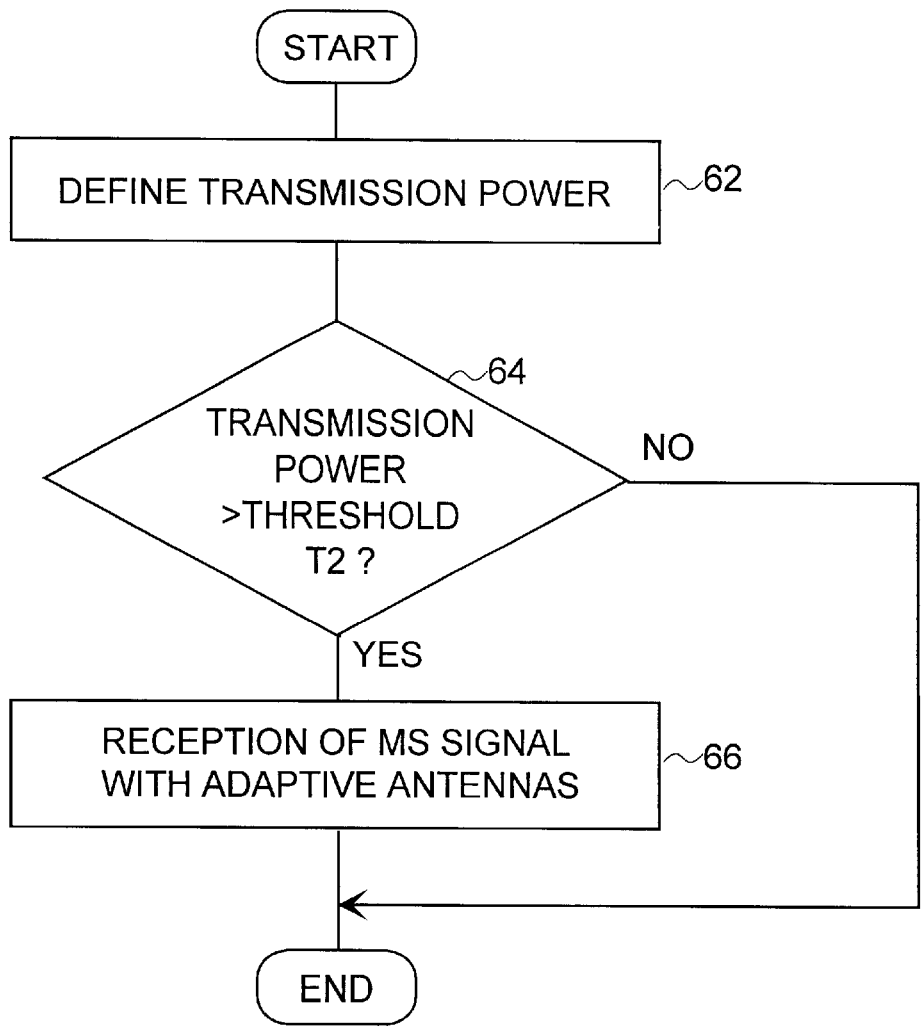

REDUCING INTERFERENCE IN A MOBILE COMMUNICATIONS SYSTEM

This application is a continuation of PCT/FI98/00302, filed Apr. 7, 1998.

FIELD OF APPLICATION OF THE INVENTION

This invention relates to interference elimination in a mobile communications system, especially in systems using code division multiple access (CDMA) technology and/or multi-user detection.

BACKGROUND OF THE INVENTION

The function of CDMA (Code Division Multiple Access) in radio systems is based on spread spectrum communication. The signal to be sent is hashed with an individual hash code assigned to the subscriber, whereby the transmission will spread out on a broad-band radio channel, which is e.g. 1.25; 6.4 or 20 MHz. It is hereby possible for several subscribers on the same broad-band radio channel at the same time to send CDMA signals processed with different hash codes. In CDMA systems, the special hash code of each subscriber will hereby produce a traffic channel in the system in the same manner as a time slot in TDMA systems. At the receiving end the CDMA signal is decoded with the subscriber's hash code, whereby a narrow-band signal will result. Broad-band signals of other subscribers represent noise in the receiver beside the desired signal.

FIG. 1 in the attached drawing shows a block diagram of a typical mobile communications system. A mobile station MS is connected over a radio path to at least one base station BS, in the case shown in FIG. 1 to base station BS1. A base station controller BSC controls the function of all base stations BS under its control. Several base station controllers BSC are usually subordinated to a mobile services switching centre MSC. The mobile services switching centre MSC is connected to other mobile services switching centres and to other networks, e.g. to a public services telephone network PSTN, to another mobile station network PLMN, to an ISDN network ISDN or to a packet switched public data network PSPDN.

The mobile station MS is usually connected to a base station providing the best signal quality. During handover in the course of a call the mobile station can in CDMA systems be simultaneously connected to several base stations BS, until some base station signal turns out to be better than the others, whereby the call will continue through this base station BS. Such handover is called soft handover. The mobile station MS sends to the base station BS a coded, interleaved, hashed and modulated signal over the radio path. The base station BS receives a broad-band radio signal which includes the signals of several mobile stations MS and from which the individual signals must be detected. To powerful signals, a broad-band interference of other signals represents background noise only, but weak signals may be covered under the interference level caused by other signals, whereby it is difficult to detect them. This situation is illustrated in FIG. 2 by power levels of signals S1–S5 shown as a function of time. The power level of signal S1 in the figure is considerably above the power levels of the other signals S2–S5 and it hereby causes most interference to signals S2–S5.

Different common detection methods are known from the CDMA context for improving the detection of every individual subscriber's signal by utilising the signal parameters of other subscribers. By combining signals arriving from surrounding cells in the common detection process it is possible in some cases further to improve the advantage which can be achieved with the method. Interference cancellation is generally performed by eliminating interference signals from the signals received at the base station so that the other signals are eliminated as serial or parallel processing from the received signal, whereby the interference level will be lowered from the viewpoint of the undetected signal. Interference cancellation may be performed with either a broad-band or a narrow-band signal. Interference cancellation is typically used to reduce interference in the same cell.

It is known at the base station to use so-called adaptive antennas, that is, alternating directional pattern antennas, with which the reception at the base station is directed to a narrow geographical area. Signals arriving from outside the main beam of the adaptive directional antenna will be attenuated compared with signals received from the main beam at a ratio determined by the directional pattern of the antenna. When using adaptive antennas, the chosen mobile station may send its signal at a transmission power which is lower than the normal power, thanks to the better antenna amplification and signal processing at the reception. Therefore, adaptive antennas are used mainly for reducing the interference caused in the neighbouring cell and for increasing the coverage area of the base station in the direction of the main beam of the antenna. The directional antennas may be adaptive ones, the direction of which can be changed, or they may be fixedly directed. The signal sent by the individual mobile station can be received through several antenna beams, whereby it is possible e.g. to combine signal components caused by multipath propagation or otherwise to process a mobile station signal received with different antennas, e.g. by weighting received signals in different ways so that the signal will be amplified compared with other received signals. The directional pattern of an adaptive antenna can thus be changed by receiving the signal through several fixedly directed antenna beams and by weighting the thus received signals in a suitable manner. With adaptive antennas a lowering of the interference level is achieved owing to the narrow antenna beam, as the interference from other subscribers is reduced and the interference caused to other subscribers is reduced.

The use of adaptive antennas is illustrated in FIG. 3, wherein cell coverage C1 is arranged for base station BS with an omnidirectional antenna provided with a fixed antenna pattern while cell coverages C2–C4 are arranged with directed antennas. In the case shown in FIG. 3, reception of the signal of mobile station MS1 is arranged at base station BS with the antenna of cell C2 whereas reception of the signal of mobile station MS3 is arranged with the antenna of cell C3. The signal of mobile station MS1 can also be received e.g. through the antenna of cell C3 and correspondingly the signal of mobile station MS3 can be received with the antenna of cell C2 and/or cell C4. The signals of mobile station MS1 which are received through different antennas are combined in order to facilitate detection of the signal. Likewise, all signals received from mobile station MS3 are combined. The signals of the other mobile stations MS2 and MS4 shown in the FIGURE are received with the omnidirectional antenna of cell C1. It is a drawback in the use of adaptive antennas that reception directed to all subscribers requires much processing in the network.

Patent application publication EP-491 668 presents a method of demodulation of a CDMA signal based on a reduction of interference which is performed in a signal strength order. The system presented in the publication includes arranging means with which the signals are arranged in an order according to their relative signal strength. In the order established by the arranging means each signal is demodulated, detected, re-modulated and subtracted from the common signal. Such interference cancellation requires much processing capacity of the system, when each signal is subtracted in turn from the common signal.

Patent application publication EP-493 904 presents an arrangement for detecting received CDMA signals from a set of several signals. In the arrangement a signal received at the base station is input to several reception branches, each of which will detect the signal of a certain traffic channel. In the reception branches the signal is demodulated, despread and each individual signal is detected. These individual signals are classified in regard to their information contents as probably correct and probably incorrect signals respectively. The signals which belong to the first class and the information of which is correct, are modulated and re-hashed, whereupon these broad-band signals are subtracted from the original received signal, whereby the interference level of the remaining signal is lowered. From the signal thus processed those signals are re-detected which were classified originally as containing incorrect information, in order to ensure correct information in all individual signals. It is a particular problem with the interference cancellation method presented in the publication that the reliability check, wherein signals are classified as probably correct and probably incorrect signals, will cause a delay in signal processing. This delay in signal processing is especially problematic for such signals for which a short delay only can be accepted in their transfer.

It is also a problem with the known interference elimination methods presented above that they are very complex, they demand much computing and thus require a great processing ability of the mobile communications system, that is, they consume the limited capacity of the system. Especially as the number of mobile station subscribers is growing, the need for processing capacity increases considerably, because the capacity must be dimensioned according to the maximum number of users.

BRIEF DESCRIPTION OF THE INVENTION

It is a purpose of this invention to reduce interference in a mobile communications network by controlling the processing performed at the receiving end.

This objective is achieved with the method according to the invention which is characterised by what is stated in the independent claims 1, 14 and 28. Special embodiments of the invention are presented in the dependent claims.

The invention is based on the idea of classifying mobile stations, according to the interference caused by their signal to other signals or according to the interference tolerance of their signal or the complexity of decoding of their signal, into classes demanding different further processing, and of defining for each class a class-specific way of functioning, whereby the total network interference will be reduced by following these ways of functioning. The method according to the invention reduces the interference caused by those signals only whose interference reduction will result the biggest reduction of the overall interference caused to the signals of other subscribers, and/or which cause interference that can be most easily reduced. The interference caused by these chosen signals is reduced e.g. by directing directional beams of adaptive antennas at these mobile stations and/or by eliminating the most strongly interfering signals from the received signal and/or by establishing a powerful correction of errors for a certain set of signals. In the method according to the invention such a reduction of interference is performed on the signals of one class which will result in a simplified processing of the signals of another class.

The complexity of processing to be performed for reducing interference depends on the number of subscribers and hash codes to be processed. The computing needed for eliminating interference is simplified when according to the present invention the effect of the worst interference only is eliminated for other subscribers. In addition, it is most easy to estimate the signals of the strongest interference and to eliminate them from the other signals. The greatest advantage is also achieved by eliminating the strongest interference, as the relatively biggest part of the interference is eliminated.

It is indeed an advantage of the interference reduction according to the invention that a great benefit is achieved through interference elimination by using as little equipment resources of the mobile communications system as possible.

It is another advantage of such a method that it simplifies the interference elimination performed in the receiver.

A further advantage of the method according to the invention is that signal processing in the mobile communications system will not be jammed and that the processing capacity of the equipment in the system can be used for some other purpose.

LIST OF FIGURES

The invention will now be described in greater detail in connection with preferred embodiments and referring to the enclosed drawings, wherein:

FIG. 5 is a flow chart of a second example of a primary embodiment of the invention; and FIG. 6 is a flow chart of a secondary embodiment of the invention.

DETAILED DESCRIPTION OF THE INVENTION

Figure 1:
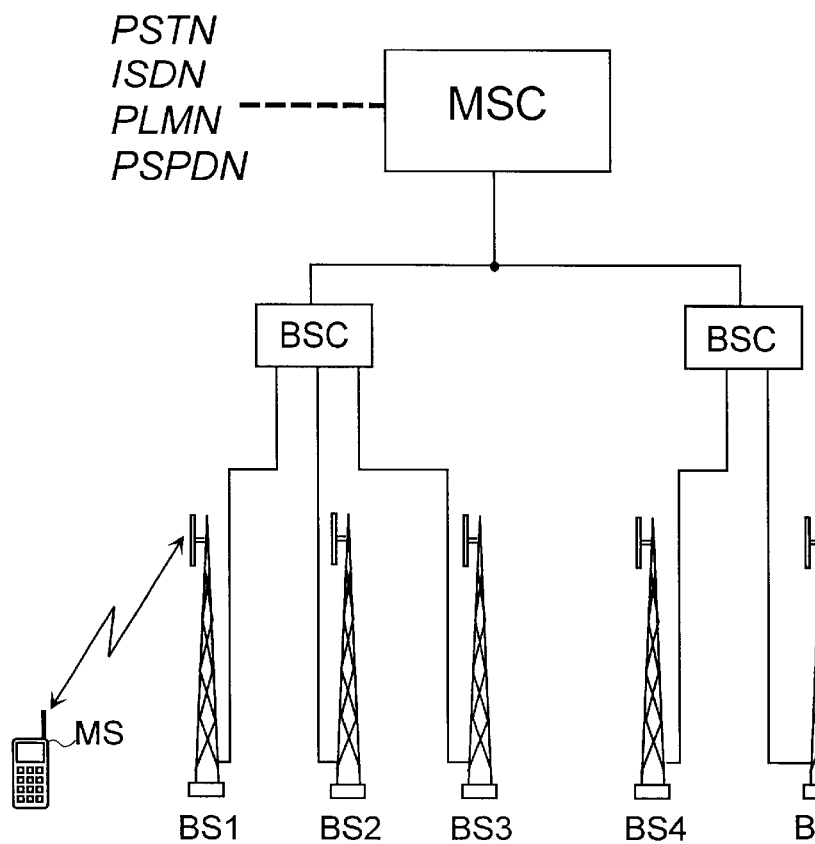
FIG. 1 shows such parts of a mobile communications system which are essential for the invention.

The present invention may be applied in connection with any mobile communications system. Hereinafter, the invention will be described in greater detail and by way of example mainly in connection with a mobile communications system of the CDMA type. FIG. 1 shows the simplified structure of a mobile communications system described above.

Figure 2:
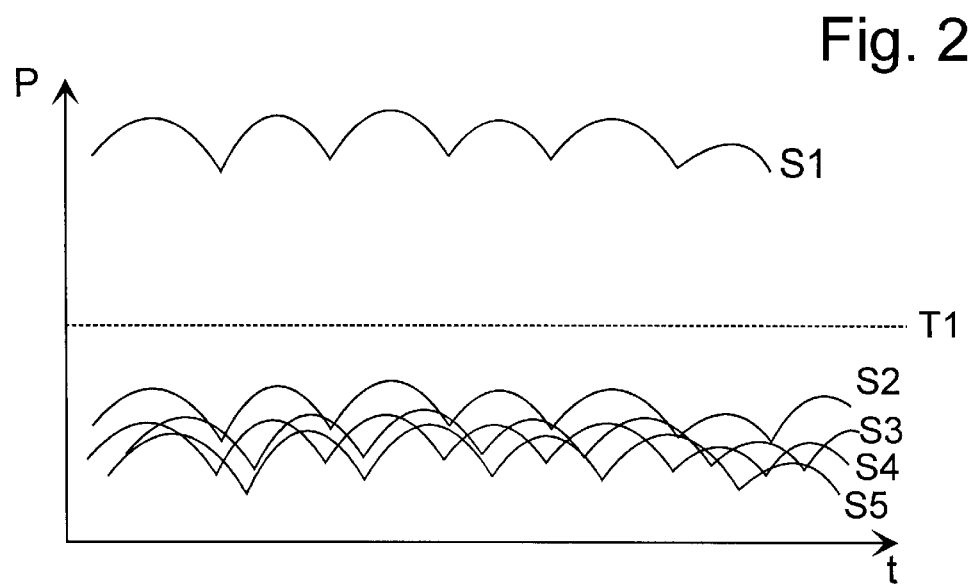
FIG. 2 shows an example of power levels as a function of time of signals received at a base station.
Figure 4:
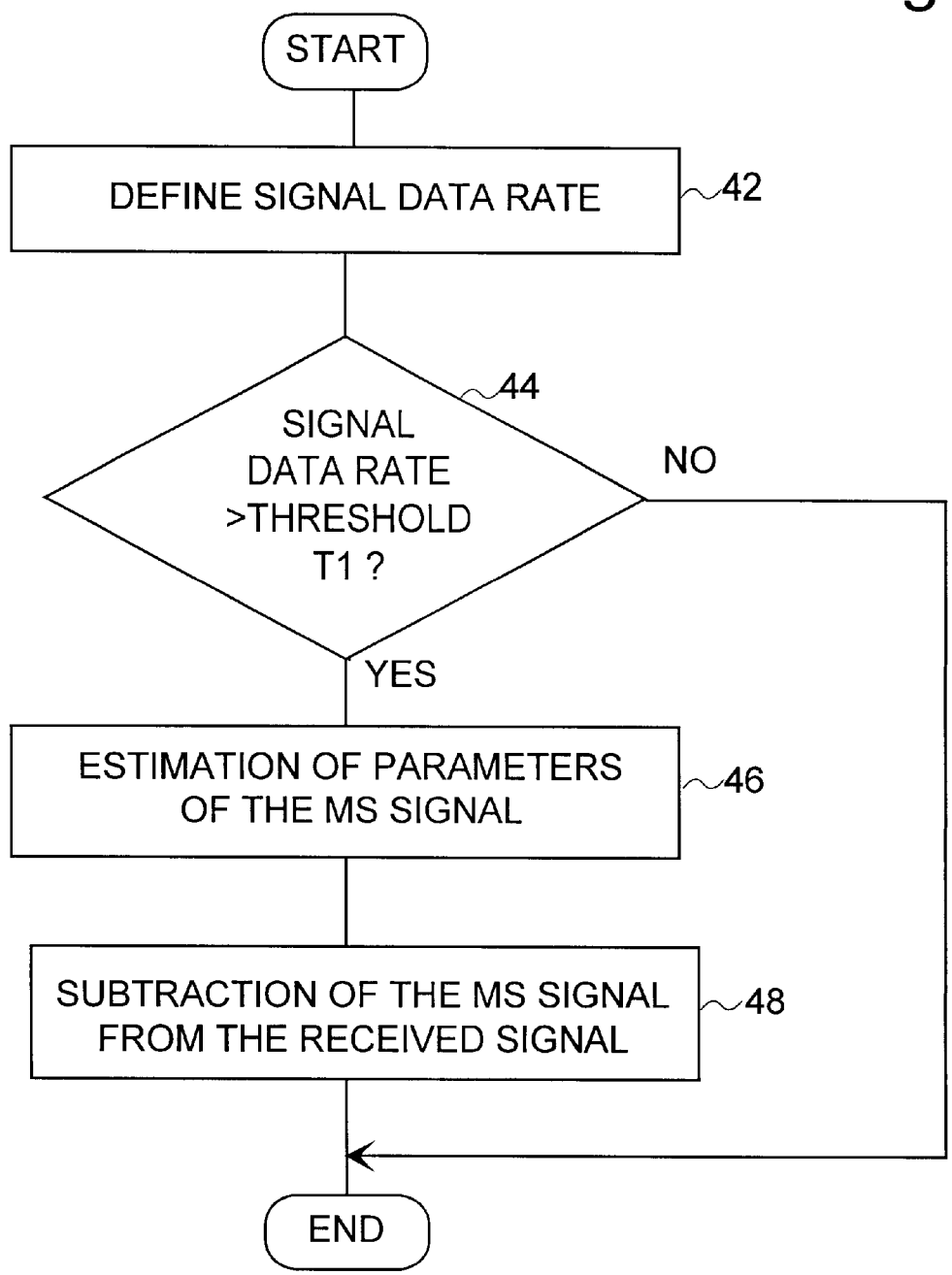
FIG. 4 is a flow chart of a first example of a primary embodiment of the invention.

The invention will be described more closely in the following in the light of a primary embodiment of the invention and referring to the flow charts of FIGS. 4 and 5. In a primary embodiment of the method according to the invention, signals received from mobile station subscribers are divided at base station BTS into two classes, which are used as a basis for subtracting from the received signal in the base station receiver the signals of one classification group in order to detect all received signals. The classification of received signals can be performed based on the interference caused by an individual signal to the other signals, based on the interference tolerance of an individual signal or based on the complexity of decoding of an individual signal. Classification may also be performed by combining the above-mentioned classification grounds in a suitable manner. In the example shown in FIG. 4, the invention is described in the light of a classification performed on the basis of interference caused by an individual signal to other signals. The data rate of each received signal is determined at point 42 in FIG. 4. In a CDMA system, a high data rate increases the number of bits to be transmitted, and thus it increases the total energy to be transmitted and received. The traffic frame structure of a CDMA system is different at different data rates, so the data rate may be defined e.g. according to the frame structure. According to the present invention, the signals received at base station BS are classified at point 44 according to a pre-established threshold value. If the data rate of a signal concerned exceeds the established threshold value T1, the signal is placed in the class of those signals which cause such interference to the other signals which is aimed to be eliminated. The dashed line drawn in FIG. 2 represents threshold value T1, based on which the signal S1 in FIG. 2 is classified as an interfering signal fulfilling the condition of point 44 of FIG. 4 and signals S2–S5 in FIG. 2 are classified based on a check at point 44 in FIG. 4 as signals needing no special measures according to the primary embodiment of the invention for lowering the interference level. Modelling of such a signal to be eliminated is performed at point 46 by estimating those channel parameters on grounds of which the signal in question can be formed. Signal delay, amplitude, and phase are examples of channel parameters to be estimated. It is easier to estimate channel parameters when the signal data rate is high and the received power of the signal is thus higher than normal. With the aid of these parameters the interfering signal in question is subtracted at base station BS from the signal originally received (point 48). In practice, interference cancellation may be performed e.g. through regeneration of the interfering signal. According to prior art, signals of mobile station MS are detected at the base station, signals to be subtracted before the interference cancellation according to the invention and others after the performed interference cancellation. Since signals sent at the highest data rates will be relatively most interfering to other signals, elimination of these interfering signals will result in the biggest advantage with a minimum of signal processing.

Other signal classification grounds than the signal data rate are also suitable for use in the method presented above in connection with a primary embodiment of the invention. Other grounds for classification of signal interference may be e.g. the received power, the transmission power, the distance between user and the base station location or any combination of the grounds mentioned above. For example, the service quality require-ment or a soft handover situation may be criteria for a classification done on a basis of interference tolerance of the individual signal. The service quality requirement may comprise e.g. a bit error ratio requirement, such as $10^{-4}$ for speech or $10^{-6}$ for database access, a data rate requirement, such as 8–32 kbit/s for speech or 2.4–768 kbitls for database access and/or a permissible delay, such as 40 ms for speech or over 200 ms for database access. A classification based on the complexity of decoding of the individual signal is performed e.g. based on the complexity of estimation of the used channel coding level or channel profile. Signals protected e.g. by weak channel coding may thus be classified as belonging with the signals to be eliminated while signals having a powerful channel coding are classified as signals to be detected after interference elimination.

In the example shown in FIG. 5, the invention is described in the light of classification based on the interference tolerance of the individual signal. In the example shown in FIG. 5, the transfer delay allowed for the signal is the measure used for the interference tolerance of the signal. The maximum permissible delay established for each received signal is determined at point 52 in FIG. 5. Signals received at base station BS are classified at point 54 according to a pre-established threshold value T10. Estimation of channel parameters is performed at point 56 for those signals which have a permissible delay shorter than the pre-established threshold value T10. With the aid of these parameters the said interfering signal is subtracted at base station BS from the signal originally received (point 58). Thus, in the example shown in FIG. 5, the signals are classified as signals allowing a short delay, which are subtracted at base station BS from the originally received signal, and as signals allowing a long delay, which are detected after the interference cancellation and the detected signal of which is not utilised in the interference cancellation process. The signal transfer delay of services allowing a short delay will thus not become longer than the permissible delay and, on the other hand, detection is facilitated with the aid of the interference cancellation process for those signals the transfer of which will not be impeded by the delay in interference cancellation caused by detection of the signal of services allowing a longer delay.

FIG. 6 is a flow chart of a method according to a secondary embodiment of the invention, wherein reduction of interference is performed with the aid of adaptive antennas. In the secondary embodiment of the invention, signals from mobile stations MS received at base station BS are divided into two classes according to the interference caused by the individual signal to the other signals, e.g. according to the transmission power. The transmission power of each received signal is determined at point 62, e.g. based on a power control directed by base station BTS and performed at the mobile station MS. A check is made at point 64 of whether the signal transmission power exceeds a preestablished threshold value T2. If the threshold value T2 is exceeded, the signal concerned is understood as one interfering with the other signals, and reception of this signal is arranged to take place with adaptive antennas (point 66). Owing to the better amplification of an adaptive reception antenna, the interfering mobile station MS may reduce its transmission power, whereby other interference caused to the network will be reduced. On the other hand, signals received with different antennas may be processed and combined in various ways in the receiver of base station BS. Other signal characteristics than the transmission power may also be used as grounds for classification in the secondary embodiment of the invention in the same way as was described above in connection with the primary embodiment. Classification may also be performed on other grounds than signal interference, as was also described above in connection with the primary embodiment.

Figure 3:
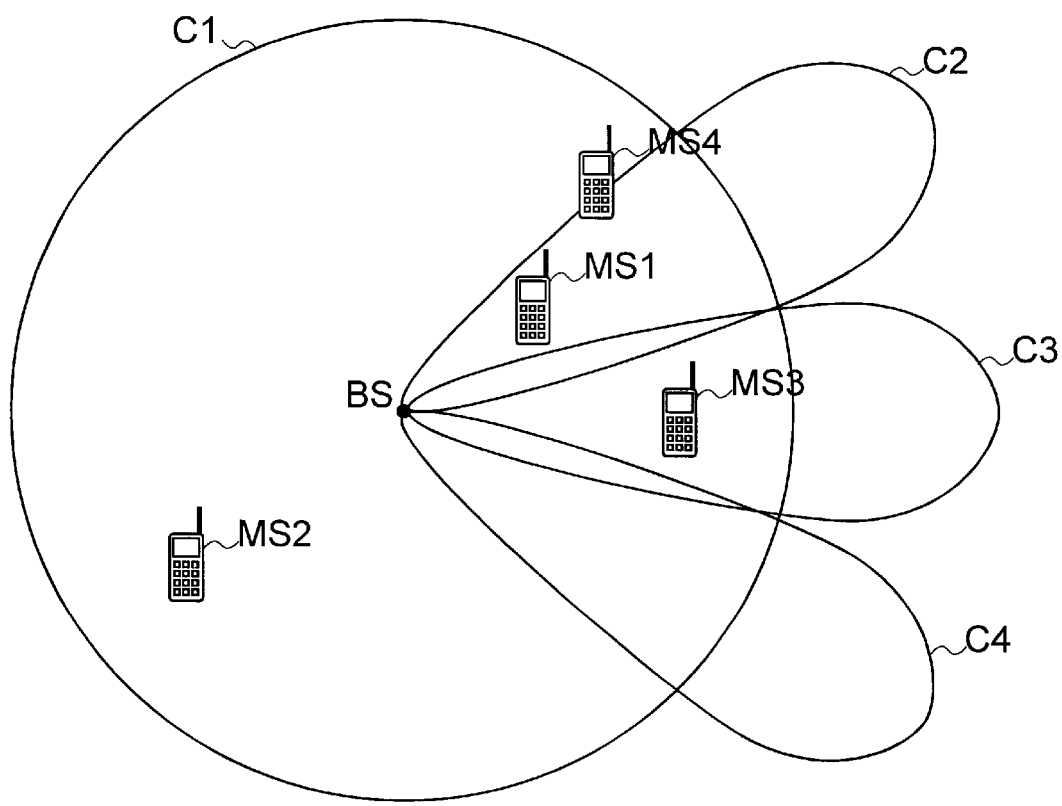
FIG. 3 shows use of adaptive antennas at a base station BS.

With directed antennas the further advantage is achieved that an interfering signal of base station BS can be directed by an adaptive directional antenna to that mobile station especially for which the transmission is intended, whereby the interference level received by other mobile stations MS located in different directions is lower. For example, in the case shown in FIG. 3, a signal to be sent to mobile station MS1 through the directed antenna of cell C2 of base station BS will probably not interfere with mobile station MS2 so much as if the base station BS would send the said signal by way of an omnidirectional antenna of cell C1 having a fixed antenna pattern.

The primary and secondary embodiments of the invention which were presented above may also be combined e.g. so that according to some grounds for classification the signals are divided into two classes, whereby signals belonging to one class are received e.g. through one directed antenna. Signals with the highest interference which are to be sent e.g. from the area of an adjacent antenna beam can thus be subtracted from the received signal. Processing of signals divided into two or more classes may be defined also for such performance that the signals of one class are received with directed antennas and the signals of another class are subtracted from the other signals in order to reduce common interference.

A signal protected with a powerful error correction is difficult to estimate and to subtract from the signals of other subscribers. On the other hand, a powerful error correction will allow signal transmission with a transmission power below the normal power and without any major transfer errors, when other interference does not occur to any great extent. The susceptibility to interference and/or the interfering effect of signals of low signal power or low data rate may be controlled with the aid of error correction, e.g. channel coding and/or retransmission. Thus, in a third embodiment of the method according to the invention, the classification of signals is performed correspondingly as described above in connection with the primary or secondary embodiment, e.g. according to the data rate or transmission power of the signal, or according to some other classifications grounds, e.g. the ones presented above in connection with the other embodiments. According to the third embodiment of the invention, an error correction which is more powerful than the one normally used, e.g. a powerful channel coding, is established for the signals of one class.

The functionality according to the third embodiment of the invention can also be combined with the functionality of the primary and/or secondary embodiment of the invention. E.g. by combining with the primary embodiment described above in the third embodiment an error correction stronger than normal, e.g. a powerful channel coding, is established for signals which are below the threshold value T1 and the channel parameters of which, therefore, need not be estimated for interference cancellation. Owing to the established error correction which is more efficient than normally, the interference tolerance of the concerned signal increases, whereby the carrier power of the signal can be reduced at the transmitting end. Thus, by making the error correction more efficient the signal's carrier-to-interference ratio C/I is affected so that the interfering interference level of the network will be reduced.

The classification of received signals according to the present invention may also be performed by dividing the signals into more than two classes based on predetermined criteria. The signals may e.g. be divided into classes so that signals included in the interference reduction process belong to the first class, such signals belong to the second class which must be monitored and which may cause either a constant or momentary increase in the interference level, while those signals belong to the third class which are not involved in the process so far. Also e.g. by dividing the signals according to data rate into three classes, such as under 100 kbits, 100 . . . 500 kbit/s and over 500 kbit/s, interference elimination may e.g. be performed in such a way that the signals of the top data rate class are subtracted from the received common signal before detection of the signals of the lowest class. Processing of signals belonging to the middlemost data rate class can be performed normally without any separate interference elimination. The signals of the middlemost data rate class may also be subtracted when required before detecting the signals of the lowest data rate class. Classification of signals into more than two classes is carried out e.g. by defining several threshold values T to assist in the division. A classification into e.g. three classes may be carried out by establishing for the classification two threshold values for the received signals. Classification of received signals can also be performed with the aid of two or more classification grounds.

The threshold values used to assist in classification according to the invention are defined so as to keep within desirable limits the complexity of equipment needed for the interference reduction process. Thus, the threshold values are defined taking into account the computing capacity of the system so that the maximum possible advantage is achieved by the reduction of interference. The threshold values are thus used e.g. for controlling the number of signals to be admitted into the computing process or into directed reception. The establishment of threshold values is therefore determined by, among other factors, the number of subscribers in the network, the computing capacity of the receiver performing the process and/or by the antenna assembly arranged at the place of reception. The definition and establishment of threshold values may be arranged to be carried out dynamically taking into account the current load situation and composition of the network.

The interference reduction control according to the invention is preferably located on the mobile communications network side at base station BS, since responses to interference changing quickly in time must be as prompt as possible. Interference that may be caused at base station BS1 by mobile stations MS located in connection with the base station of a neighbouring cell, e.g. base station BS2 in the case of FIG. 1, can be taken into account e.g. by modelling this received interfering signal and by subtracting it from the signal received at base station BS1 without separately detecting the interfering signal. Interference caused by mobile stations MS of a neighbouring cell can also be reduced by reporting on the interference through superior elements of the network, e.g. through the mobile services switching centre MSC and/or the base station controller BSC, and by sending a request to the neighbouring base station BS2 for a reduction of any specified interference. Base station BS2 may thus take steps to apply the functionality according to the invention for reducing the said interference passing to base station BS1, e.g. by arranging the communication of the interfering mobile station MS through an adaptive directed antenna, whereby the mobile station MS may reduce its transmission power. The control information to the unit implementing the functionality according to the invention from elsewhere in the network will be relayed e.g. by way of base station controller BSC, if the concerned base stations are located subordinated to the same base station controller BSC, or by way of base station controllers BSC and mobile services switching centre MSC, when the base stations are located subordinated to different base station controllers BSC. The control information may also be relayed directly from one base station to another, when there is a direct signaling connection between the base stations.

The reception arrangement according to the invention includes means of classification for classifying signals in the manner presented above and means for reducing radio interference according to the classification. The arrangement also preferably includes means of capacity allocation for such a determination of classification threshold values that the reduction of radio interference based on the classification will not load the reception arrangement excessively.

The interference elimination and use of adaptive antennas which were presented above in connection with the different embodiments are suitable for utilisation also in a mobile station MS which is equipped with similar means for performing interference elimination and/or with at least one adaptive antenna.

The classifications and steps based on the classification which were presented above are given by way of example only in order to illustrate the inventive idea. Classification according to the invention may of course be performed in numerous different ways and the steps to be taken according to the classification can be defined in a manner best suitable for each situation. In interference elimination to be performed on grounds of classification, subtraction of signals of at least one class is arranged from the signals of at least one other class. When using adaptive antennas, reception of signals of at least one class is arranged through at least one adaptive antenna and reception of signals of at least one other class is arranged through at least some other antenna, e.g. an omnidirectional antenna.

The drawings and the related explanation are only intended to illustrate the inventive idea. The details of the reduction of interference according to the invention may vary within the scope of the claims. Although the invention was explained above mainly in connection with a mobile communications system of the CDMA type, the presented reduction of interference may also be used for reducing interference in the same channel or an adjacent channel in systems of some other type, e.g. in hybrid systems (combined TDMA/CDMA) and in systems of the TDMA type, wherein multi-user detection is used. In systems implemented entirely or partly with time division multiple access (TDMA) technology, signals may be classified in the method of the present invention at time level in a manner advantageous for interference elimination, e.g. in the manner presented in Finnish patent application publication FI-964138.

What is claimed is:

1. A method of reducing radio interference in a mobile communications system comprising:
    communicating between at least one base station and several mobile stations in a mobile communications system having several traffic channels for communications between the base station and the mobile stations;
    receiving signals at the base station and in the mobile stations on the traffic channels, wherein the signals received at a same reception point cause interference to one another;
    classifying the received signals into two classes according to data rate, wherein the signals having a higher data rate than a threshold data rate value are classified as belonging to a top class while the signals having a lower data rate than the threshold data rate value are classified as belonging to a lower class, and
    subtracting the signals belonging to the top class from the received signals at the same reception point for reducing a total interference.

2. The method according to claim 1 further comprising providing at least one adaptive antenna at the reception point for processing the received signals at the reception point into one of the classes.

3. The method according to claim 2 further comprising processing the signals of the top class, with the adaptive antenna, by subtracting of the signals of the top class from the received signals.

4. The method according to claim 2, wherein the processing the signals at the reception point further comprises error correcting individual signals of the lower class.

5. The method according to claim 4, wherein the error correcting is provided by channel coding.

6. The method according to claim 4, wherein the error correcting is provided by retransmission.

7. The method according to claim 1, wherein the signals belonging to the lower class forms an intermediate signal formed by subtracting the signals of the top class from the signal received at the reception point, the intermediate signal is divided into at least two subclasses according to a data rate of the signals belonging to the intermediate signal, for performing an interference reducing action in one of the subclasses.

8. The method according to claim 7, wherein the interference reducing action is provided by error correction of individual signals of at least one subclass.

9. The method according to claim 8, wherein the error correction is provided by channel coding.

10. The method according to claim 8, wherein the error correction is provided by retransmission.

11. The method according to claim 7, wherein the interference reducing action is provided by using an adaptive antenna which is arranged to receive individual signals of a subclass.

12. The method according to claim 7, a specific interference reducing action is performed in several subclasses.

13. The method according to claim 1, wherein a complexity of signal decoding is used with the data rate for classifying the received signals.

14. The method according to claim 7, wherein a complexity of signal decoding is used with the data rate for classifying the received signals.

15. The method according to claim 1, wherein the classifying received signals the threshold value is defined according to processing resources needed by the mobile communications system.

16. The method according to claim 7, wherein the classifying received signals the threshold value is defined according to processing resources needed by the mobile communications system.

17. The method according to claim 1, wherein the classification of a threshold value is defined on a receiver basis.

18. The method according to claim 1, wherein the classifying the received signals further comprising interference information concerning signals to be processed is relayed from elsewhere in the network, and classification of the signals are performed according to the threshold value and relayed interference information.

19. A method of reducing radio interference in a mobile communications system comprising:
    communicating between at least one base station and several mobile stations in a mobile communications system having several traffic channels for communications between the base station and the mobile stations;
    receiving signals at the base station and in the mobile stations on the traffic channels, wherein the signals received at a same reception point cause interference to one another;
    classifying the received signals into two classes according to an interference tolerance, wherein the signals having a lower tolerance than a threshold tolerance value are classified as belonging to a top class while the signals having a higher tolerance than the threshold tolerance value are classified as belonging to a lower class, and
    subtracting the signals belonging to the top class from the received signal at the same reception point for reducing the total interference.

20. The method according to claim 19, further comprising providing at least one adaptive antenna at the reception point for processing the received signals at the reception point into one of the classes.

21. The method according to claim 20 further comprising processing the signals of the top class with the adaptive antenna by subtracting of the signals of the top class from the received signals.

22. The method according to claim 20, wherein the processing the signals at the reception point further comprises error correcting individual signals of the lower class.

23. The method according to claim 22, wherein the error correcting is provided by channel coding.

24. The method according to claim 22, wherein the error correcting is provided by retransmission.

25. The method according to claim 19, wherein the signals belonging to the lower class forms an intermediate signal formed by subtracting the signals of the top class from the signal received at the reception point, the intermediate signal is divided into at least two subclasses according to the interference tolerence of the signals belonging to the intermediate signal, for performing an interference reducing action in one of the subclasses.

26. The method according to claim 25, wherein the interference reducing action is provided by error correction of individual signals of at least one subclass.

27. The method according to claim 26, wherein the error correction is provided by channel coding.

28. The method according to claim 26, wherein the error correction is provided by retransmission.

29. The method according to claim 25, wherein the interference reducing action is provided by using an adaptive antenna which is arranged to receive individual signals of a subclass.

30. The method according to claim 25, a specific interference reducing action is performed in several subclasses.

31. The method according to claim 19, wherein a complexity of signal decoding is used with the interference tolerance for classifying the received signals.

32. The method according to claim 25, wherein a complexity of signal decoding is used with the interference tolerance for classifying the received signals.

33. The method according to claim 19, wherein the classifying received signals the threshold value is defined according to processing resources needed by the mobile communications system.

34. The method according to claim 25, wherein the classifying received signals the threshold value is defined according to processing resources needed by the mobile communications system.

35. The method according to claim 19, wherein the classification of a threshold value is defined on a receiver basis.

36. The method according to claim 19, wherein the classifying the received signals, interference information concerning signals to be processed is relayed from elsewhere in the network, and classification of the signals are performed according to the threshold value and relayed interference information.

37. The method according to claim 19, wherein the interference tolerance of the signal is determined according to a transmission delay permissible for the signal.

38. The method according to claim 25, wherein the interference tolerance of the signal is determined according to a transmission delay permissible for the signal.

39. The method according to claim 19, wherein the interference tolerance of the signal is determined according to a bit error rate permissible for the signal.

40. The method according to claim 25, wherein the interference tolerance of the signal is determined according to a bit error rate permissible for the signal.

41. A method of reducing radio interference in a mobile communications system comprising:

communicating between at least one base station and several mobile stations in a mobile communications system having several traffic channels for communications between the base station and the mobile stations;

receiving signals at the base station and in the mobile stations on the traffic channels, wherein the signals received at a same reception point cause interference to one another;

classifying the received signals into two classes according to a complexity of decoding of the signals, wherein the signals having weak channel coding and are below a threshold value of the complexity are classified as belonging to a top class while the signals having powerful channel coding and are above the threshold value are classified as belonging to a lower class, and subtracting the signals belonging to the top class from the received signal at the same reception point for reducing the total interference.

42. The method according to claim 41, further comprising providing at least one adaptive antenna at the reception point by processing the received signals at the reception point into one of the classes.

43. The method according to claim 42 further comprising processing the signals of the top class with the adaptive antenna for subtracting of the signals of the top class from the received signals.

44. The method according to claim 41, wherein the signals belonging to the lower class forms an intermediate signal formed by subtracting the signals of the top class from the signal received at the reception point, the intermediate signal is divided into at least two subclasses according to of the complexity of decoding of the signals belonging to the intermediate signal, for performing interference reducing action in one of the subclasses.

45. The method according to claim 44, wherein the interference reducing action is provided by using an adaptive antenna which is arranged to handle individual signals of the subclass.

46. The method according to claim 41, wherein a subclass specific interference reducing action is performed in several subclasses.

47. The method according to claim 41, wherein for classifying received signals the threshold value is defined according to the processing resources needed by the mobile communications system.

48. The method according to claim 44, wherein for classifying received signals the threshold value is defined according to the processing resources needed by the mobile communications system.

49. The method according to claim 41, wherein the classification of a threshold value is defined on a receiver basis.

50. The method according to claim 41, wherein for the classification of received signals interference information concerning signals to be processed Is relayed from elsewhere in the network, and classification of signals is performed according to the threshold value and relayed interference information.

* * * * *